United States Patent
Lanzinger et al.

(10) Patent No.: US 11,791,698 B2
(45) Date of Patent: Oct. 17, 2023

(54) BLOW-OFF RING

(71) Applicant: Bayerische Motoren Werke Aktiengesellschaft, Munich (DE)

(72) Inventors: Stefan Lanzinger, Steinkirchen (DE); Fabian Pohlkoetter, Diessen am Ammersee (DE); Stefan Zeilhofer, Furth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1148 days.

(21) Appl. No.: 16/394,462

(22) Filed: Apr. 25, 2019

(65) Prior Publication Data

US 2019/0252955 A1 Aug. 15, 2019

Related U.S. Application Data

(63) Continuation of application No. PCT/EP2017/074637, filed on Sep. 28, 2017.

(30) Foreign Application Priority Data

Oct. 28, 2016 (DE) ..................... 10 2016 221 253.2

(51) Int. Cl.
*H02K 15/00* (2006.01)
*B08B 5/02* (2006.01)
(Continued)

(52) U.S. Cl.
CPC ............. *H02K 15/00* (2013.01); *B05B 1/005* (2013.01); *B05B 1/207* (2013.01); *B08B 5/02* (2013.01); *H02K 15/12* (2013.01)

(58) Field of Classification Search
CPC ........ H02K 15/00; H02K 15/12; B05B 1/005; B05B 1/207; B08B 5/02
See application file for complete search history.

(56) References Cited

U.S. PATENT DOCUMENTS 3,949,908 A * 4/1976 Baillie ................... B01J 8/0015
422/216
5,028,009 A * 7/1991 Takata ................... A01C 7/087
239/689

(Continued)

FOREIGN PATENT DOCUMENTS

CN 203610237 U 5/2014
DE 10 2009 045 200 A1 4/2011
(Continued)

OTHER PUBLICATIONS

Chinese Office Action issued in Chinese application No. 201780052317.1 dated May 13, 2020 (Ten (10) pages).
(Continued)

*Primary Examiner* — Qingzhang Zhou
(74) *Attorney, Agent, or Firm* — Crowell & Moring LLP

(57) ABSTRACT

A blow-off ring for cleaning components of an electric motor includes a first ring element and a second ring element, where the first ring element and the second ring element can be assembled in order to enclose an annular cavity within the blow-off ring. The first ring element and/or the second ring element has nozzles which are connected to the annular cavity and which extend along an inner circumferential surface and/or an outer circumferential surface of the blow-off ring.

11 Claims, 7 Drawing Sheets

(51) Int. Cl.
    *B05B 1/20*     (2006.01)
    *B05B 1/00*     (2006.01)
    *H02K 15/12*    (2006.01)

(56) References Cited

U.S. PATENT DOCUMENTS 5,205,306 A * 4/1993 Peterson ................ A47K 3/287
            4/569
2016/0126816 A1 * 5/2016 Kimura .................. H02K 15/12
            118/58

FOREIGN PATENT DOCUMENTS

| DE | 102009045200 | * | 4/2011 |
| DE | 20 2011 050 673 U1 | | 11/2011 |
| DE | 10 2011 054 736 A1 | | 5/2012 |
| DE | 20 2016 106 364 U1 | | 1/2017 |

OTHER PUBLICATIONS

PCT/EP2017/074637, International Search Report dated Feb. 1, 2018 (Two (2) pages).
German Search Report issued in German counterpart application No. 10 2016 221 253.2 dated Sep. 13, 2017, with Statement of Relevancy (Eight (8) pages).

* cited by examiner

BLOW-OFF RING

CROSS REFERENCE TO RELATED APPLICATIONS

This application is a continuation of PCT International Application No. PCT/EP2017/074637, filed Sep. 28, 2017, which claims priority under 35 U.S.C. § 119 from German Patent Application No. 10 2016 221 253.2, filed Oct. 28, 2016, the entire disclosures of which are herein expressly incorporated by reference.

BACKGROUND AND SUMMARY OF THE INVENTION

The present invention relates to a blow-off ring. The invention also relates to a blow-off apparatus comprising at least one blow-off ring of the kind. Components of an electric motor can be cleaned using the blow-off ring and/or the blow-off apparatus.

The manufacture of electric motors is known from the prior art. Electric motors of this kind are used, amongst other things, in vehicles. Several aspects have to be taken into consideration when the electric motor is used in a vehicle. For example, provision is made for a stator winding to be surrounded by a resin. This ensures complete impregnation of the winding. If this is not the case, there is a risk of air bubble formation which has an adverse effect on heat dissipation. However, resin must not set on the laminated core of the stator since otherwise subsequent friction-free functioning of the electric motor can no longer be ensured. If the resin cures on the laminated core of the stator, costly subsequent work is required or the manufactured stator has to be disposed of as a reject.

In order to clean the stator, it is known that a copper ring which has a large number of nozzles is manufactured. Nozzles of this kind consist of relatively small copper pipes. However, it has been found that these pipes become bent and/or blocked during use. This leads to it no longer being possible for the stator to be completely cleaned.

The object of the present invention is to provide a blow-off ring for cleaning components of an electric motor, which blow-off ring allows safe and reliable cleaning of the components together with simple and cost-effective production and assembly.

The object is therefore achieved by a blow-off ring for cleaning components of an electric motor, which blow-off ring comprises a first ring element and a second ring element. The first ring element and the second ring element can be formed, in particular, in an annular manner. In this case, provision is preferably made for both the first ring element and also the second ring element to have an L-shaped profile or a stepped profile. The shape of the profile can correspond, in particular, to a radial section through the first ring element or the second ring element. The first ring element and the second ring element can be put together in order to enclose an annular cavity in this way. In particular, a substantially O-shaped profile or a substantially rectangular profile is generated by putting together the two L-shaped or stepped profiles. Particularly advantageously, the blow-off ring can be disassembled into the first ring element and the second ring element at any time. Owing to the design of the blow-off ring, that is to say, in particular, owing to the blow-off ring being assembled from two L-shaped interengaging profiles, stability of the blow-off ring is improved both when used during insertion of the components of the electric motor and also during a cleaning process of the blow-off ring and/or a transportation process of the blow-off ring. Therefore, the risk of damage to the blow-off ring is reduced. Furthermore, provision is made for the first ring element and/or the second ring element to have nozzles. The nozzles are connected to the annular cavity and extend along an inner circumferential surface and/or an outer circumferential surface of the blow-off ring. Therefore, the blow-off ring can be used in order to blow-off and therefore to clean a radially inner surface and/or a radially outer surface of the component of the electric motor. In order to clean the component of the electric motor using the blow-off ring, an excess pressure has to be generated within the annular cavity. This excess pressure leads to fluid flowing out through the nozzles, as a result of which the blow-off effect is produced. In this case, it is clear that, on account of the ability of the blow-off ring to be disassembled into the first ring element and the second ring element, the nozzles can be cleaned more easily than was the case for nozzles from the prior art. In particular, each nozzle can be cleaned both from inside and also from outside, that is to say both from that side of the first ring element and/or of the second ring element on which the cavity is located and also from that side of the first ring element and/or the second ring element on which fluid is let out from the blow-off ring. Therefore, the blow-off ring does not necessarily have to be disposed of if one or more nozzles become blocked, but rather can be cleaned simply and with little expenditure. A nozzle is understood to mean an apparatus through which the fluid flows out of the blow-off ring in a directed manner. In particular, the nozzle is of tubular form, wherein a cross section across the profile of the nozzle can either remain the same or change.

Provision is preferably made for the nozzles to be in the form of a bore within the first ring element and/or the second ring element. In this way, bending of the nozzles is prevented. In addition, manufacture of individual nozzles is simplified, and therefore more nozzles can be fitted than in the case of known blow-off rings. Furthermore, the manufacture of nozzles in the form of bores allows exact setting of an orientation of the nozzles. Owing to the ability to exactly set the orientation in this way, eddies against the desired blow-off direction can be avoided in particular. If the nozzle should become completely blocked, so that cleaning is no longer possible, it is possible to produce the nozzle again by making a bore once again. A bore is understood to mean, in general, an opening in the first ring element and/or the second ring element, wherein the opening runs completely through a wall of the first ring element and/or the second ring element.

One end of the bore, which end faces the cavity, is particularly advantageously formed in such a way that it has a larger diameter than an opposite end of the bore. Therefore, the nozzle can be easily cleaned when the blow-off ring is disassembled into the first ring element and the second ring element. The relatively small diameter at the opposite end of the bore allows a defined flow of fluid out of the nozzle to be set. In particular, the end of the bore with the relatively small radius therefore constitutes a fluid outlet out of the blow-off ring. Therefore, a characteristic of the associated nozzle can be individually set by choosing the relatively small diameter.

Provision is preferably made for either the first ring element or the second ring element to have the described nozzles. Therefore, either the first ring element or the second ring element does not have any nozzles as described above. Therefore, provision is particularly advantageously made for a fluid to be let out from either the first ring element or the second ring element. The respective other ring element is then advantageously impermeable to fluids.

The first ring element and the second ring element preferably each have at least two seal receptacles. Seals for sealing off the cavity can be arranged in the seal receptacles. This ensures that fluid from the cavity can leave the blow-off ring only through the nozzles. This ensures defined cleaning of the components of the electric motor. In particular, the quality of cleaning is improved in this way.

The first ring element is connected to the second ring element in an interlocking and/or cohesive and/or frictional manner. The connection between the first ring element and the second ring element is, in particular, of reversible design. The first ring element is particularly advantageously connected to the second ring element by means of a screw connection, particularly advantageously by means of additional screws, in particular by means of four screws. If additional screws are used, provision is preferably made for the screws to have a screw head seal in the form of a sealing disk. In the threads into which the screws are screwed, the leak-tightness is preferably ensured by way of a sealing means and/or a Teflon strip.

The first ring element and/or the second ring element are preferably manufactured from aluminum and/or from steel. A stainless steel is particularly advantageously used. In this case, provision is made, in particular, for the first ring element and/or the second ring element to be resistant to chemical and/or mechanical cleaning. Therefore, cleaning of the blow-off ring is once again simplified since, in particular, chemical cleaning methods can be used.

The invention also relates to a blow-off apparatus. The blow-off apparatus comprises an inner blow-off ring and an outer blow-off ring, wherein the inner blow-off ring has a smaller outside diameter than an inside diameter of the outer blow-off ring. The inner blow-off ring comprises an inner first ring element having a large number of nozzles, while the outer blow-off ring comprises an outer first ring element having a large number of nozzles. The nozzles are arranged on an outer circumferential surface of the inner blow-off ring and on an inner circumferential surface of the outer blow-off ring. Advantageously, no additional nozzles are present outside the described surfaces. Therefore, fluid flows out only via the outer circumferential surface of the inner blow-off ring and via the inner circumferential surface of the outer blow-off ring. As a result, a component of an electric motor can be passed through between the inner blow-off ring and the outer blow-off ring in order to thereby be blown off and therefore cleaned both radially from the inside and also radially from the outside. Provision is made for both the inner blow-off ring and also the outer blow-off ring to be blow-off rings as described above. Therefore, the blow-off apparatus allows safe and reliable cleaning of the component of the electric motor, wherein at the same time the ability of the blow-off apparatus itself to be cleaned is simplified owing to the use of the above-described blow-off rings. At the same time, the stability of the blow-off apparatus is improved on account of the above-described stability of the blow-off rings.

The inner blow-off ring is preferably arranged concentrically in relation to the outer blow-off ring. Therefore, blow-off from the inside and blow-off from the outside take place at the same time. This allows cleaning of the component of the electric motor over the entire circumference.

The inner blow-off ring preferably has an inner second ring element and the outer blow-off ring preferably has an outer second ring element. In this case, provision is made for the inner first ring element or the outer first ring element and the inner second ring element or the outer second ring element to be integrally formed as a pot element. At the same time, provision is made for the component of the electric motor to be able to be inserted into the pot element. The pot element therefore serves, in particular, to collect the blown-off resin. In addition, the above-described stable construction at least of the outer blow-off ring allows deformation of the pot element to be avoided. Overall, play of the pot element is prevented by virtue of there being a collar on the pot elements owing to the formation of the outer blow-off ring. Therefore, the pot element can have only thin walls since deformation of these thin walls is prevented on account of the outer blow-off ring.

Owing to the above-described improved ability to clean the blow-off ring and/or the blow-off apparatus, a blow-off picture that is always consistent can be achieved, as a result of which the need for subsequent work and/or rejection when producing the components of the electric motors are/is considerably reduced.

Further details, features and advantages of the invention can be gathered from the following description and the Figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
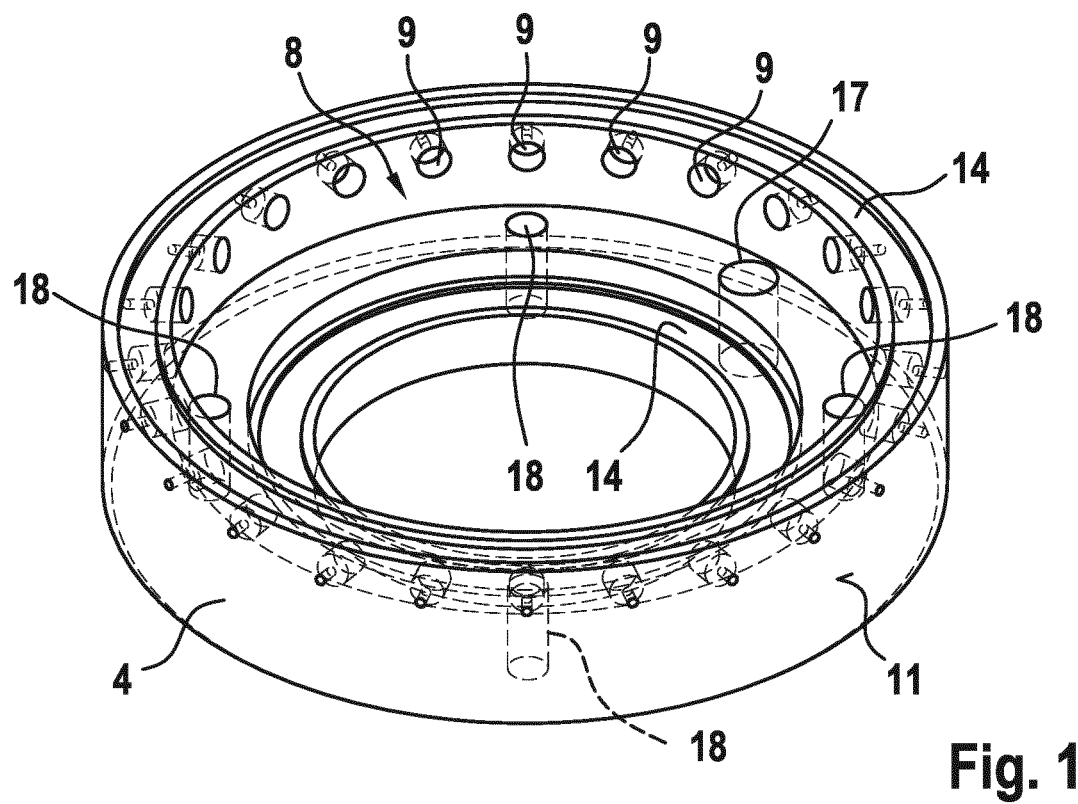
FIG. 1 shows a schematic view of an inner first ring element of an inner blow-off ring according to an exemplary embodiment of the invention.
Figure 6:
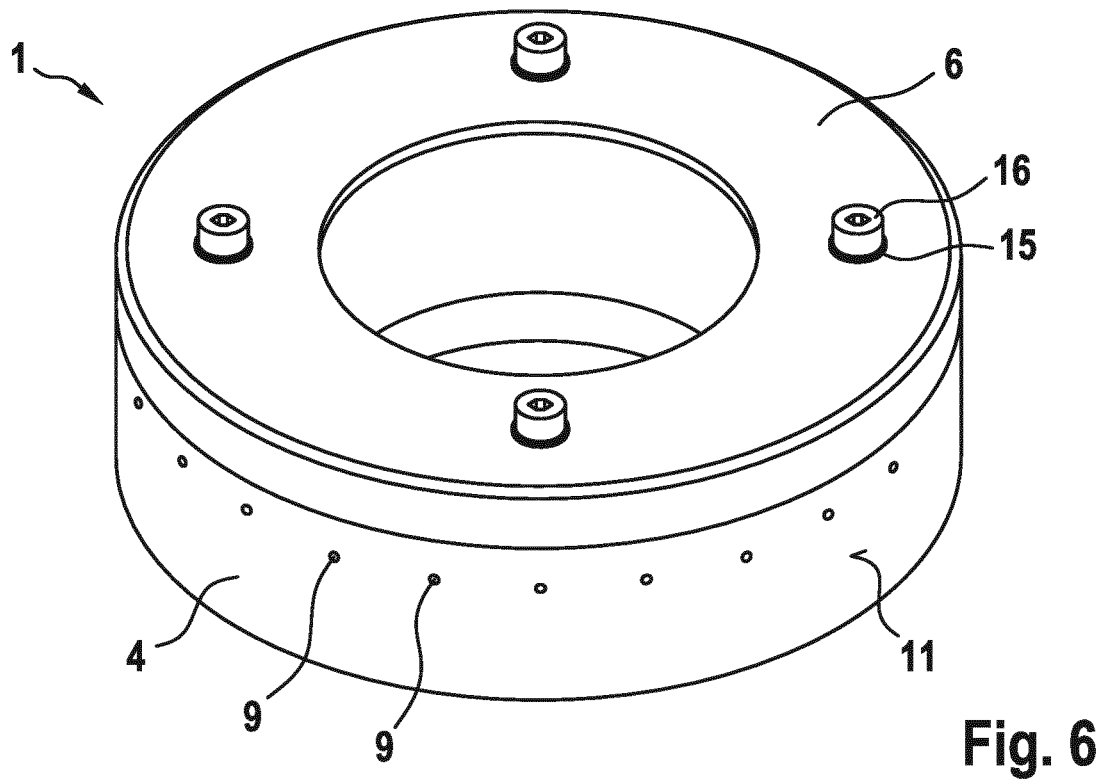
FIG. 6 shows a schematic view of the inner blow-off ring according to the exemplary embodiment of the invention.
Figure 7:
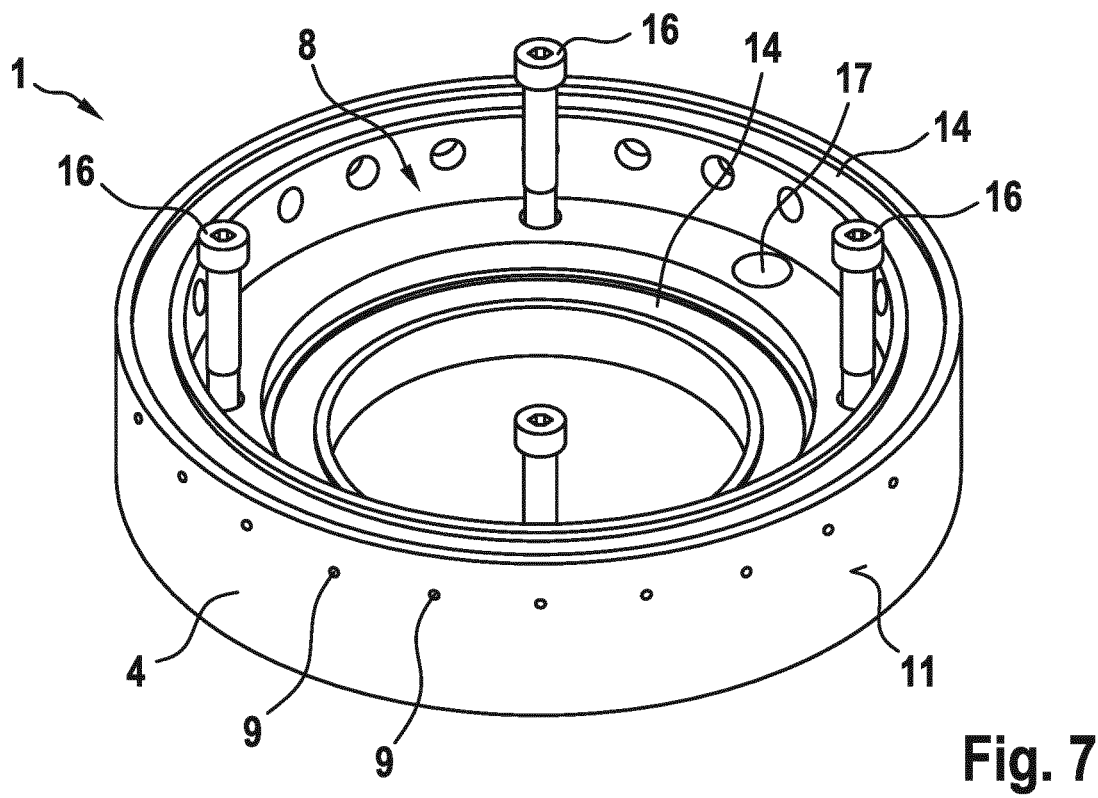
FIG. 7 shows a schematic view of a portion of the inner blow-off ring according to the exemplary embodiment of the invention.

FIG. 1 schematically shows an inner first ring element 4. The inner first ring element 4 is part of an inner blow-off ring 1 according to an exemplary embodiment of the invention which is shown in FIGS. 6 and 7.

The inner first ring element 4 advantageously has a stepped profile with an L-shaped outer surface and a stepped inner surface. Therefore, the inner first ring element 4 has, in particular, two outer walls. A large number of bores are arranged in an outer circumferential surface 11, so that the outer circumferential surface 11 has a large number of nozzles 9. The nozzles will be described in more detail below with reference to FIGS. 3 to 5.

Owing to the nozzles 9, it is possible for air to be blown out of the outer circumferential surface 11 of the inner first ring element 4. To this end, fresh air can be supplied via an air inlet 17. The air inlet 17 serves to supply air to an annular cavity 8. The annular cavity 8 is created by an inner second ring element 6 being combined with the inner first ring element 4. The inner second ring element 6 is illustrated in FIG. 2.

Figure 2:
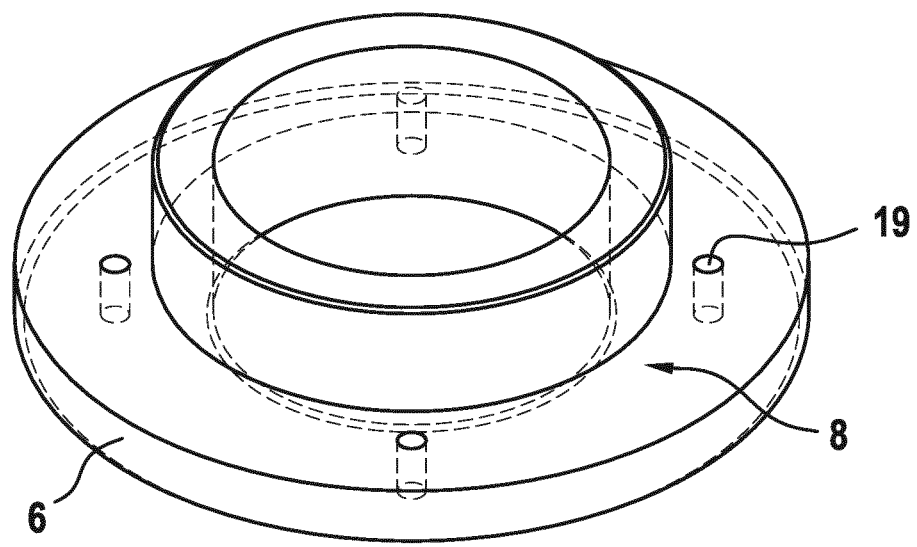
FIG. 2 shows a schematic view of an inner second ring element of the inner blow-off ring according to the exemplary embodiment of the invention.

As is clear from FIG. 2, the inner second ring element 6 also has a stepped profile with an L-shaped outer surface and a stepped inner surface. If the inner first ring element 4 and the inner second ring element 6 are combined, the stepped profiles interengage. This leads to the described cavity 8 being delimited from the surrounding area. The cavity 8 is connected to an outer surrounding area of the inner first element 4 and of the inner second ring element 6, in particular, only by the nozzles 9 and by the air inlet 17.

In order to ensure that a fluid which is supplied to the cavity 8 via the air inlet 17 leaves the cavity 8 only via the nozzles 9, the inner first ring element 4 has two seal receptacles 14. The seal receptacles 14 serve to receive in each case one seal, in particular in each case one O-ring, so that the cavity 8 is sealed off from an outer surrounding area. In particular, this prevents a fluid which is present within the cavity 8 from being able to escape through assembly points between the inner first ring element 4 and the inner second ring element 6.

Figure 3:
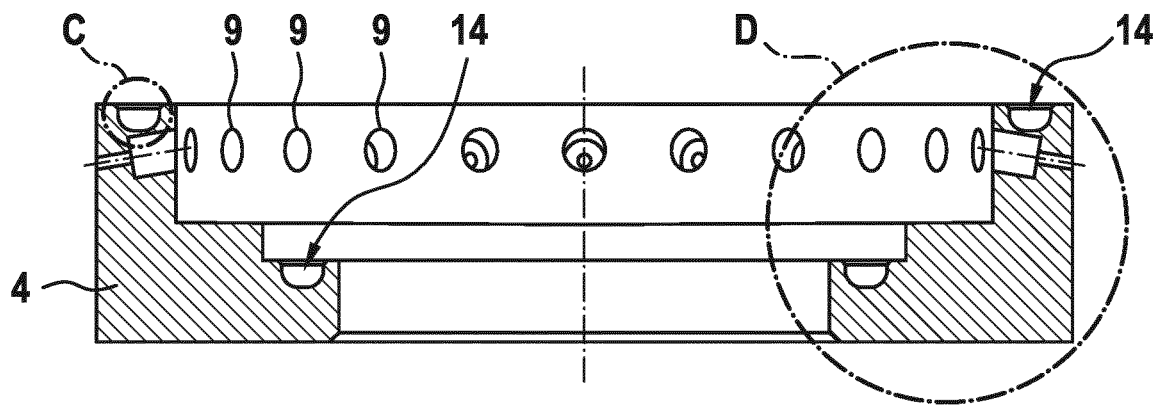
FIG. 3 shows a schematic sectional view of the inner first ring element of the inner blow-off ring according to the exemplary embodiment of the invention.
Figure 4:
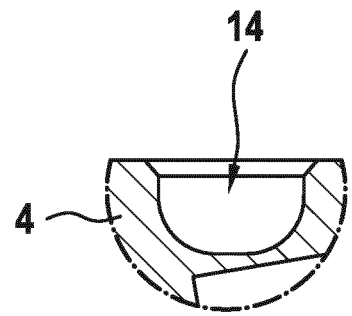
FIG. 4 shows a first schematic view of a detail of the inner first ring element of the inner blow-off ring according to the exemplary embodiment of the invention.

FIG. 3 schematically shows a sectional view through the inner first ring element 4. FIG. 3, in particular the region marked as detail C, which is illustrated in FIG. 4, shows that the seal receptacles 14 comprises a U-shaped recess. Therefore, it is possible to seal off the inner first ring element 4 from the inner second ring element 6.

Figure 5:
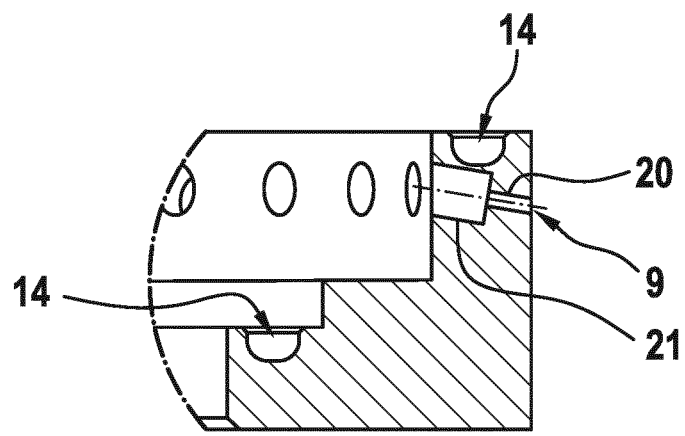
FIG. 5 shows a second schematic view of a detail of the inner first ring element of the inner blow-off ring according to the exemplary embodiment of the invention.

FIG. 3 also shows the construction of the nozzles 9. For example, a nozzle 9 is shown in the region marked as detail D, which is illustrated in FIG. 5. The nozzles 9 are realized by a bore through a wall of the inner first ring element 4, wherein the bore comprises a first bore 20 and a second bore 21. The first bore 20 and the second bore 21 are, in particular, of colinear design and therefore have the same center axis. Provision is made for the first bore 20 to have a smaller diameter than the second bore 21. The second bore 21 adjoins the cavity 8, while the first bore 20 points out of the first blow-off ring 1.

Owing to the second bore 21, it is easier to clean the nozzles 9 on account of the increased diameter. A characteristic of the nozzles 9 can be set by the first bore 20. In particular, an outflow direction and also an outflow rate can be defined by means of the first bore 20.

FIG. 1 also shows that the inner first ring element 4 has threaded bores 18. It is clear from FIG. 2 that the inner second ring element 6 has corresponding passage bores 19. The passage bores 19 and the threaded bores 18 serve to fix the inner first ring element 4 and the inner second ring element 6 to one another. This is clear from FIGS. 6 and 7.

FIG. 6 shows a schematic view of an inner blow-off ring 1 which is made up of the inner first ring element 4 and the inner second ring element 6, as shown in FIGS. 1 and 2. FIG. 7 shows the same inner blow-off ring 1, wherein only the inner second ring element 6 and the seals which are present in the seal receptacles 14 are not shown.

It is clear that the inner first ring element 4 and the inner second ring element 6 are fixed to one another by screws 16. The screws 16 are passed through the passage bores 19 and screwed within the threaded bores 18. In order to avoid fluid outlet from the cavity 8 through the threaded bores 18, either a sealing means and/or a Teflon strip can be used here. In order to prevent fluid being let out from the cavity 8 through the passage bores 19, a seal disk 15 is provided. This ensures that fluid, which passes through the air inlet 17 into the cavity 8, can leave the cavity 8 solely via the nozzles 9.

Owing to the screw-connection by means of the screws 16, the inner blow-off ring 1 can be disassembled into the inner first ring element 4 and the inner second ring element 6 at any time. After the disassembly, the nozzles 9 can be reached from both sides, that is to say both from the first bore 20 and also from the second bore 21. In this way, the nozzles 9 can be cleaned simply and with little expenditure. Provision is particularly advantageously made for the inner blow-off ring 1 to be manufactured from a stainless steel, so that chemical cleaning of the nozzles 9 is also possible, without the inner blow-off ring being damaged in the process.

Figure 8:
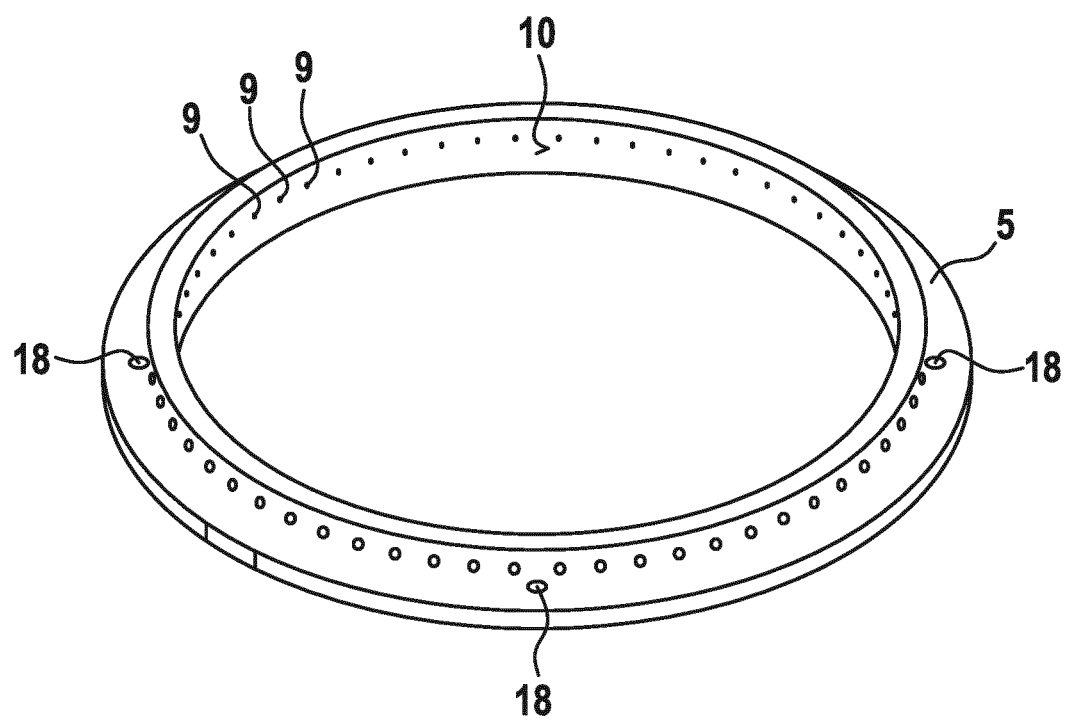
FIG. 8 shows a schematic view of an outer first ring element of an outer blow-off ring according to an exemplary embodiment of the invention.
Figure 9:
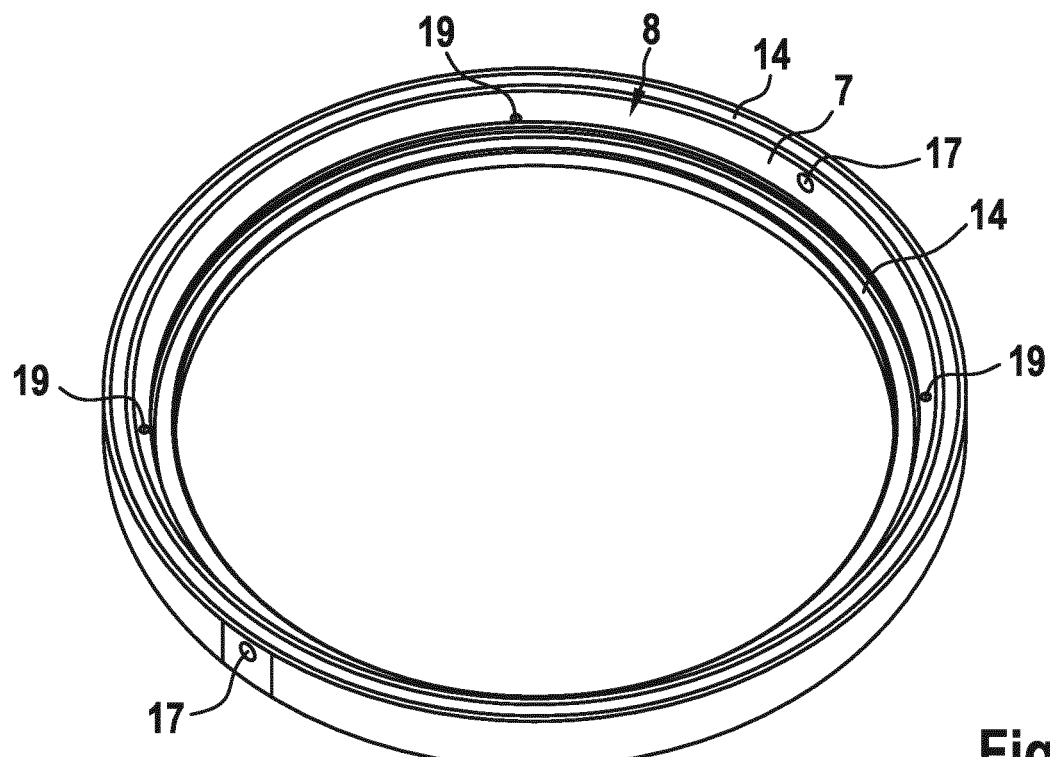
FIG. 9 shows a schematic view of an outer second ring element of the outer blow-off ring according to the exemplary embodiment of the invention.
Figure 10:
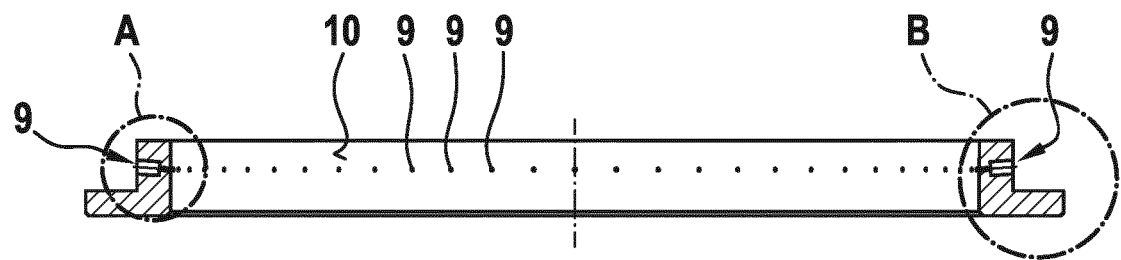
FIG. 10 shows a schematic sectional view of the outer first ring element of the outer blow-off ring according to the exemplary embodiment of the invention.
Figure 11:
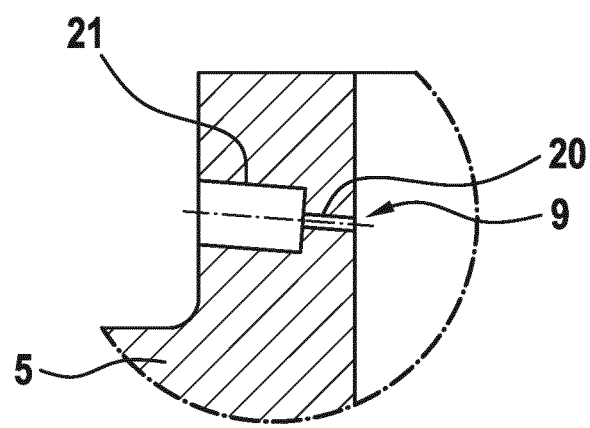
FIG. 11 shows a first schematic view of a detail of the outer first ring element of the outer blow-off ring according to the exemplary embodiment of the invention.
Figure 12:
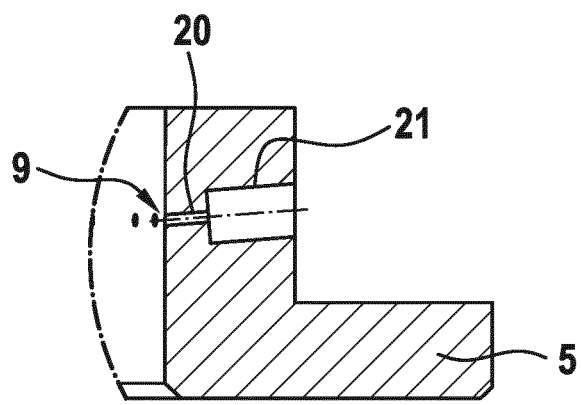
FIG. 12 shows a second schematic view of a detail of the outer first ring element of the outer blow-off ring according to the exemplary embodiment of the invention.
Figure 13:
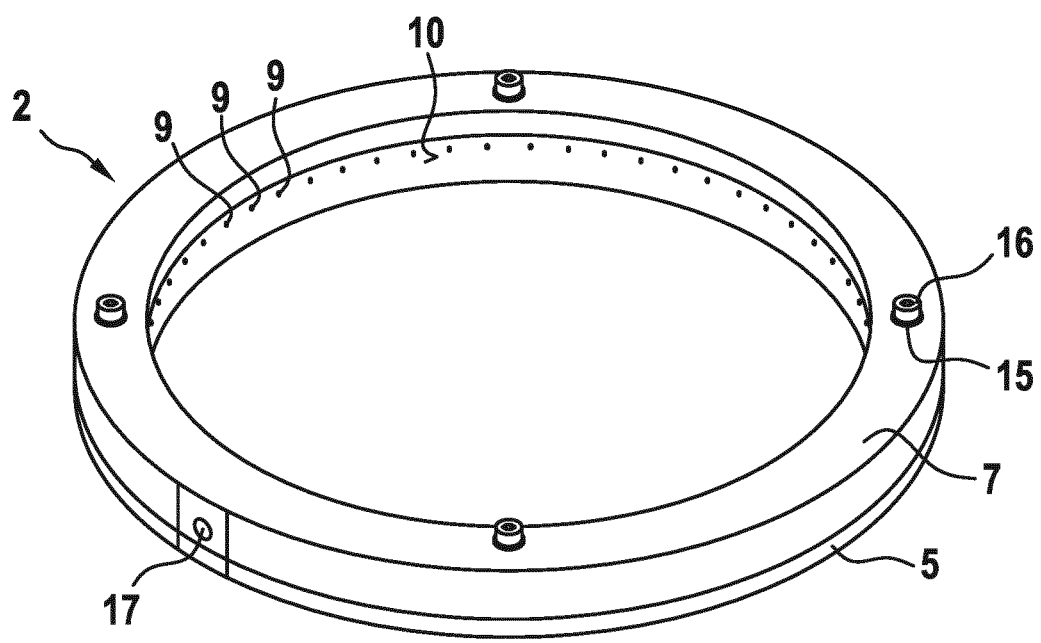
FIG. 13 shows a schematic view of the outer blow-off ring according to the exemplary embodiment of the invention.
Figure 14:
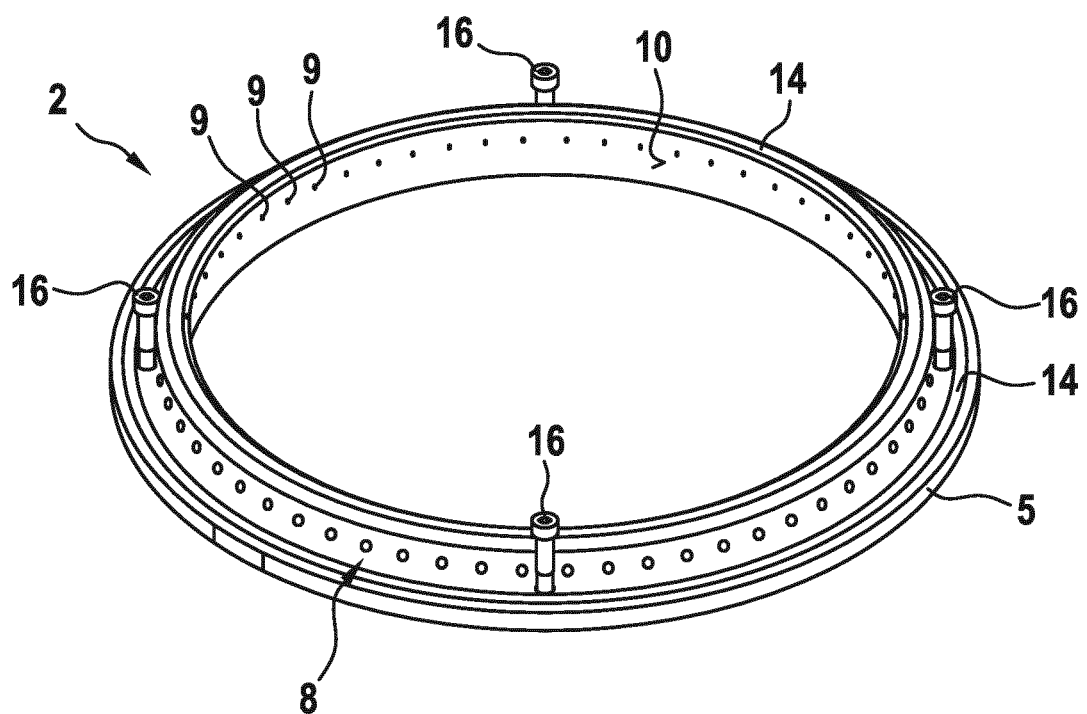
FIG. 14 shows a schematic view of a portion of the outer blow-off ring according to the exemplary embodiment of the invention.

FIG. 8 shows an outer first ring element 5 of an outer blow-off ring 2 according to an exemplary embodiment of the invention. FIG. 9 shows an outer second ring element 7 of the outer blow-off ring 2. FIGS. 10 to 12 show different sectional views through the outer first ring element 5. Finally, FIGS. 13 and 14 show the outer blow-off ring 2 itself.

FIG. 8 shows the same as FIG. 1 in respect of functioning. Similarly, FIG. 9 shows the same as FIG. 2 in respect of functioning. FIG. 10 shows the same as FIG. 3 in respect of functioning, while FIGS. 11 and 12 show the same as FIGS. 4 and 5 in respect of functioning. Finally, FIGS. 13 and 14 show the same as FIGS. 6 and 7 in respect of functioning. Therefore, the above description of FIGS. 1 to 7 is also applicable to FIGS. 8 to 14, where only the term inner blow-off ring 1 is to be replaced by the term outer blow-off ring 2, the term inner first ring element 4 is to be replaced by the term outer first ring element 5, the term inner second ring element 6 is to be replaced by the term outer second ring element 7, and finally the term outer circumferential surface 11 is to be replaced by the term inner circumferential surface 10.

In contrast to the inner blow-off ring 1 in which fluid can be blown out of the outer circumferential surface 11 via the nozzles 9, fluid can be blown out of the inner circumferential surface 10 via the nozzles 9 by the outer blow-off ring 2. In principle, the construction and the manner of operation both of the inner blow-off ring 1 and of the outer blow-off ring 2 are identical.

Figure 15:
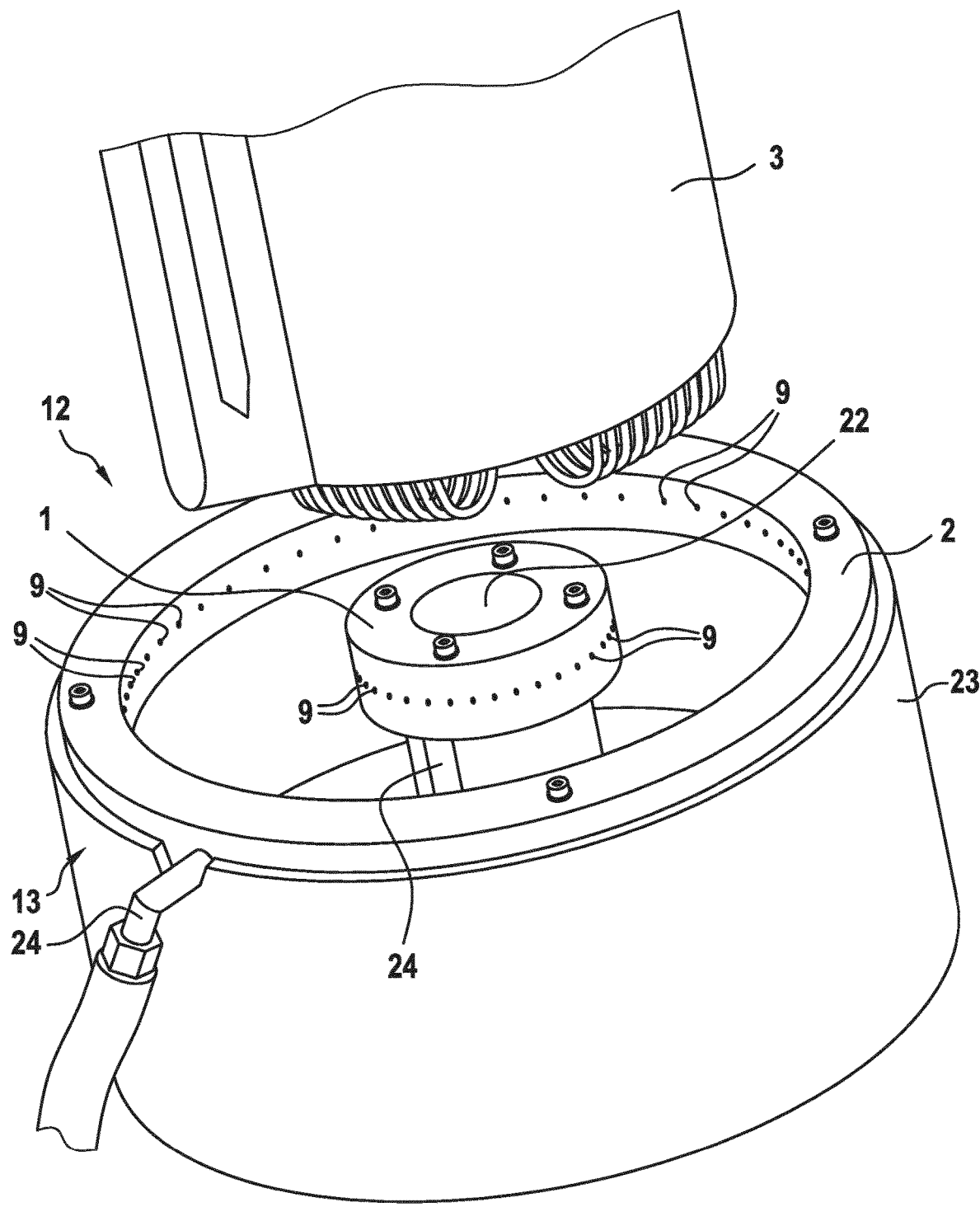
FIG. 15 shows a schematic view of a blow-off apparatus according to an exemplary embodiment of the invention.

FIG. 15 schematically shows a blow-off apparatus 12 with which a stator 3 of an electric motor can be cleaned. The stator 3 is therefore considered to be a component of the electric motor. The blow-off apparatus 12 comprises an inner blow-off ring 1 and also an outer blow-off ring 2 as respectively described above and shown in FIGS. 1 to 14.

The inner blow-off ring 1 is arranged concentrically in relation to the outer blow-off ring 2, wherein an outer diameter of the inner blow-off ring 1 is smaller than an inner diameter of the outer blow-off ring 2. Therefore, the stator 3 can be passed through between the inner blow-off ring 1 and the outer blow-off ring 2. During the process of passing the stator 3 through, the stator can be inserted between the nozzles 9 of the inner blow-off ring 1 and of the outer blow-off ring 2.

The inner blow-off ring 1 is held by a web element 22. The outer blow-off ring 2 is fastened to an outer wall 23. In this case, provision is particularly advantageously made for web element 22 and outer wall 23 to jointly form a pot element 13. This pot element 13 can, in particular, replace the inner first ring element 4 or the inner second ring element 6 and additionally the outer first ring element 5 or the outer second ring element 7. The resin which is blown off from the stator 3 can be collected and in particular can be discharged from the pot element 13.

Finally, it is clear that both the inner blow-off ring 1 and also the outer blow-off ring 2 can be supplied with fresh air via an air supply 24. The fresh air is supplied to the air inlets 17 via the air supply 24 and in this way enters the cavities 8 of the inner blow-off ring 1 and of the outer blow-off ring 2. From there, the fresh air is routed through the nozzles 9 to the stator 3 for cleaning purposes.

It is clear that, on account of the stable construction in particular of the outer blow-off ring 2, the outer wall 23 is also stable and cannot be deformed. Therefore, the outer wall 23 itself can also be manufactured from a relatively thin metal sheet. Therefore, simple and cost-effective construction of the blow-off apparatus 12 is rendered possible.

LIST OF REFERENCE SYMBOLS

1 Inner blow-off ring
2 Outer blow-off ring
3 Stator
4 Inner first ring element
5 Outer first ring element
6 Inner second ring element
7 Outer second ring element
8 Cavity
9 Nozzle
10 Inner circumferential surface
11 Outer circumferential surface
12 Blow-off apparatus
13 Pot element
14 Seal receptacle
15 Seal disk
16 Screw
17 Air inlet
18 Threaded bore
19 Passage bore
20 First bore
21 Second bore
22 Web element
23 Outer wall
24 Air supply The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A blow-off ring for cleaning a component of an electric motor, comprising:
    a first ring element;
    a second ring element, wherein the first ring element and the second ring element are fixable to each other and wherein the first ring element and the second ring element define an annular cavity within the blow-off ring when fixed to each other; and
    an air inlet, wherein air is suppliable to the annular cavity by the air inlet;
    wherein the first ring element and/or the second ring element has nozzles which are connected to the annular cavity at a first end and which point out of an inner circumferential surface and/or an outer circumferential surface of the blow-off ring at a second end such that the air is blowable out through the inner circumferential surface and/or the outer circumferential surface of the blow-off ring and onto the component of the electric motor and wherein the component is a stator;
    wherein both the first ring element and the second ring element have a stepped profile with an L-shaped outer surface and a stepped inner surface and wherein when the first ring element is fixed to the second ring element the respective stepped profiles interengage with each other.

2. The blow-off ring as claimed in claim 1, wherein the nozzles are in a form of a bore within the first ring element and/or the second ring element.

3. The blow-off ring as claimed in claim 2, wherein the first end of the bore has a larger diameter than the second end of the bore.

4. The blow-off ring as claimed in claim 1, wherein either the first ring element or the second ring element has the nozzles.

5. The blow-off ring as claimed in claim 1, wherein the first ring element and the second ring element each have at least two seal receptacles and wherein respective seals are arrangeable in the at least two seal receptacles for sealing off the annular cavity.

6. The blow-off ring as claimed in claim 2, wherein the first ring element and the second ring element each have at least two seal receptacles and wherein respective seals are arrangeable in the at least two seal receptacles for sealing off the annular cavity.

7. The blow-off ring as claimed in claim 3, wherein the first ring element and the second ring element each have at least two seal receptacles and wherein respective seals are arrangeable in the at least two seal receptacles for sealing off the annular cavity.

8. The blow-off ring as claimed in claim 1, wherein the first ring element and/or the second ring element are manufactured from aluminum and/or steel.

9. The blow-off ring as claimed in claim 8, wherein the steel is stainless steel.

10. A blow-off apparatus, comprising:
    an inner blow-off ring according to claim 1; and
    an outer blow-off ring according to claim 1;
    wherein the inner blow-off ring has an outside diameter which is smaller than an inside diameter of the outer blow-off ring;
    wherein the inner blow-off ring is disposed within the outer blow-off ring;

wherein a stator of an electric motor is passable through the blow-off apparatus between the inner blow-off ring and the outer blow-off ring.

11. The blow-off apparatus as claimed in claim 10, wherein the inner blow-off ring is disposed concentrically in relation to the outer blow-off ring.

\* \* \* \* \*